(12) United States Patent
Ichikawa et al.

(10) Patent No.: US 6,569,037 B2
(45) Date of Patent: May 27, 2003

(54) GOLF BALL

(75) Inventors: Yasushi Ichikawa, Chichibu (JP); Rinya Takesue, Chichibu (JP); Eiji Takehana, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 09/986,154

(22) Filed: Nov. 7, 2001

(65) Prior Publication Data

US 2002/0052254 A1 May 2, 2002

(30) Foreign Application Priority Data

Nov. 8, 2000  (JP) ........................................ 2000-340222

(51) Int. Cl.$^7$ ......................... A63B 37/12; A63B 37/14; A63B 37/00
(52) U.S. Cl. ........................................ 473/378; 473/351
(58) Field of Search ................................ 473/351–378; 528/76

(56) References Cited

U.S. PATENT DOCUMENTS

| 4,674,751 | A |   | 6/1987  | Molitor et al. |         |
|-----------|---|---|---------|----------------|---------|
| 4,884,814 | A |   | 12/1989 | Sullivan       |         |
| 5,929,189 | A |   | 7/1999  | Ichikawa et al.|         |
| 5,993,968 | A | * | 11/1999 | Umezawa et al. | 427/407 |
| 6,123,628 | A |   | 9/2000  | Ichikawa et al.|         |
| 6,248,028 | B1| * | 6/2001  | Higuchi et al. | 473/373 |
| 6,267,692 | B1| * | 7/2001  | Higuchi et al. | 473/365 |
| 6,267,694 | B1| * | 7/2001  | Higuchi et al. | 473/373 |
| 6,422,954 | B1| * | 7/2002  | Dewanjee       | 473/378 |
| 6,435,987 | B1| * | 8/2002  | Dewanjee       | 473/378 |

FOREIGN PATENT DOCUMENTS

JP          1-308577          12/1989

* cited by examiner

Primary Examiner—Paul T. Sewell
Assistant Examiner—Alvin A. Hunter
(74) Attorney, Agent, or Firm—Sughrue Mion, PLLC

(57) ABSTRACT

In a golf ball comprising a core and a cover, the cover is formed of a cover stock based on a mixture of an ionomer resin and a thermoplastic polyurethane elastomer and having a hardness of at least 55 as measured by a ASTM D2240 type D durometer. The cover stock avoids any discoloration upon long-term UV exposure and is easy to mold. The ball has advantages including moderate backspin upon driver shots, good travel distance performance, and durability against repetitive hits.

12 Claims, No Drawings

GOLF BALL

This invention relates to a golf ball having excellent travel distance performance because of improved rebound and reception of non-excessive backspin upon driver shots as well as durability against shots.

BACKGROUND OF THE INVENTION

Ionomer resins have been widespread as the cover stock for golf balls in recent years. Ionomer resins are ionic copolymers of olefins such as ethylene with unsaturated carboxylic acids such as acrylic acid, methacrylic acid and maleic acid in which acidic groups are partially neutralized with metal ions such as sodium and zinc. Because of their durability, resilience and excellent other properties, ionomer resins are suitable as the base resin of golf ball cover stocks.

For example, the use of a relatively hard ionomer resin as the golf ball cover stock reduces the friction between the ball and a club face upon driver shots so that the ball receives relatively small backspin upon driver shots. Then the ball flies unaffected by the wind and rolls a good run, leading to a longer travel distance.

However, the use of the ionomer resin as the cover stock raises the problem that the golf ball gives a very hard feel when hit.

One solution to this problem is, as proposed in Sullivan U.S. Pat No. 4,884,814 or JP-A 1-308577, to use a soft/hard ionomer resin blend as the golf ball cover. It is a blend of a soft ionomer resin in the form of an ethylene-(meth)acrylic acid-(meth)acrylate terpolymer with a specific proportion of a hard ionomer resin in the form of an ethylene-(meth) acrylic acid copolymer having certain physical properties. This proposal is very effective for significantly ameliorating the undesired hard feel of prior art golf balls using ionomer resins in the form of ethylene-(meth)acrylic acid copolymers.

However, problems were found with the soft/hard ionomer resin blend as the golf ball cover of the above proposal. Since the relatively soft ionomer resin in the form of an ethylene-(meth)acrylic acid-(meth)acrylate terpolymer is less resilient and mechanically weak, the golf ball molded from a blend thereof is low in rebound. Since the ionomer resin in the form of an ethylene-(meth)acrylic acid-(meth) acrylate terpolymer has a high viscosity, a resin blend thereof also has an increased viscosity and becomes rather difficult to mold, often resulting in balls with poor sphericity.

Molitor et al. U.S. Pat. No. 4,674,751 discloses a cover composition comprising an ionomer resin having a specific hardness blended with a thermoplastic urethane resin having a specific hardness, the cover composition having a specific hardness. The cover composition contains a high proportion of urethane resin relative to the ionomer resin and intends to improve the performance of flexible urethane resin. Using the cover composition, a golf ball which is very soft and receives a relatively much backspin is obtained. The urethane elastomers used therein are insufficiently resilient to provide a long travel distance on driver shots. Most of the urethane elastomers used herein are likely to discolor upon UV exposure, failing to satisfy the characteristics required to withstand the rigorous environment as encountered with golf balls. The urethane elastomers used therein are less resistant to heat and difficult to mold. The durability of the ball against shots is low because of less compatibility between ionomer and urethane resins. Improvements in these respects are desired.

SUMMARY OF THE INVENTION

An object of the invention is to provide a golf ball having excellent travel distance performance because of improved rebound and reception of non-excessive backspin upon driver shots despite a relatively low hardness, as well as durability against shots. Another object of the invention is to provide a golf ball using a cover stock which avoids any discoloration upon long-term UV exposure and is easy to mold.

According to the invention, there is provided a golf ball comprising a core and a cover. The cover is formed of a cover stock based on a mixture of (a) an ionomer resin and (b) a thermoplastic polyurethane elastomer. The cover stock has a hardness of at least 55 as measured by an ASTM D2240 type D durometer.

In a preferred embodiment, the thermoplastic polyurethane elastomer (b) is one synthesized using an aliphatic or alicyclic diisocyanate as the isocyanate component. The aliphatic or alicyclic diisocyanate is typically HDI or hydrogenated MDI. The thermoplastic polyurethane elastomer (b) preferably has a modulus of resilience of at least 49%.

In another preferred embodiment, the ionomer resin (a) and the thermoplastic polyurethane elastomer (b) are mixed in a weight ratio of from 100:30 to 100:1. The cover stock preferably has a polymer decomposition temperature on TG-DTA measurement of at least 290° C.

In a further preferred embodiment, when the ball surface is exposed to a mercury lamp for 24 hours, the ball surface experiences a discoloration before and after the lamp exposure corresponding to a color difference ($\Delta YI$) of up to 8 as measured by JIS K7103 reflection method.

DESCRIPTION OF THE PREFERRED EMBODIMENT

In the golf ball comprising a core and a cover according to the invention, the cover is formed of a cover stock primarily comprising a mixture of (a) an ionomer resin and (b) a thermoplastic polyurethane elastomer.

The ionomer resin (a) used herein may be selected from well-known ones, typically metal ion-neutralized products of olefin-unsaturated carboxylic acid copolymers. The olefins used herein include those of 2 to 8 carbon atoms, for example, ethylene, propylene, butene, pentene, hexene, heptene, and octene, with ethylene being preferred. The unsaturated carboxylic acids used herein include those of 3 to 8 carbon atoms, for example, acrylic acid, methacrylic acid, maleic acid and fumaric acid, with acrylic acid and methacrylic acid being preferred.

It is generally recommended that the content of unsaturated carboxylic acid (simply referred to as acid content) be at least 10%, preferably at least 15% by weight and up to 25%, preferably up to 20%, more preferably up to 16% by weight, based on the olefin-unsaturated carboxylic acid copolymer to constitute the ionomer resin. With too low an acid content, some cover stocks may become less rigid and less resilient. With too high an acid content, some cover stocks may become too rigid and detract from the feel when hit.

The carboxyl group of the unsaturated carboxylic acid is partially neutralized with metal ions. It is recommended that the degree of neutralization be at least 20 mol %, more preferably at least 25 mol %, and up to 80 mol %, more preferably up to 70 mol %. With too low a degree of neutralization, the cover stock may become short of rigidity. With too high a degree of neutralization, the cover stock may become less flowable and less workable and the cover may show little improvement in physical properties.

The metal ions used for neutralization include $Li^+$, $Na^+$, $K^+$, $Zn^{++}$, $Co^{++}$, $Ni^{++}$, $Cu^{++}$, $Pb^{++}$ and $Mg^{++}$, with the $Li^+$, Na$^+$, Zn$^{++}$ and Mg$^{++}$ being preferred. These metal ions may be given by salts of formic acid, acetic acid, nitric acid, and carbonic acid, hydrogen carbonate salts, oxides, hydroxides, and alkoxides.

As the ionomer resin (a), any of commercially available ionomer resins for the golf ball cover stock may be used. Examples include Himilan AM7315, Himilan AM7317, Himilan AM7318, Himilan 1706, Himilan 1605, Himilan 1601, and Himilan 1557 from Dupont-Mitsui Polychemical Co., Ltd., which may be used alone or in admixture of two or more.

The ionomer resin (a) in the base mixture should preferably have a hardness as measured by an ASTM D2240 type D durometer of at least 55, more preferably at least 56, even more preferably at least 60 and up to 75, more preferably up to 65, even more preferably up to 63. With too low a durometer hardness, the cover may become less resilient. With too high a durometer hardness, the ball may sometimes become hard in feel and less durable against shots.

The other component (b) in the base mixture is a thermoplastic polyurethane elastomer which may be selected from well-known ones. Thermoplastic polyurethane elastomers synthesized using an aliphatic or alicyclic diisocyanate as the isocyanate component are recommended.

Like well-known ones, the thermoplastic polyurethane elastomer (b) should preferably have a molecular structure comprising soft segments of a high molecular weight polyol compound, hard segments of a monomolecular chain extender, and a diisocyanate component, preferably aliphatic or alicyclic diisocyanate.

The high molecular weight polyol compound used as the soft segment is not critical and may be any of polyester polyols, polyether polyols, copolyester polyols, and polycarbonate polyols. Exemplary polyester polyols include polycaprolactone glycol, poly(ethylene-1,4-adipate) glycol, and poly(butylene-1,4-adipate) glycol; an exemplary polyether polyol is polyoxytetramethylene glycol; an exemplary copolyester polyol is poly(diethylene glycol adipate) glycol; and an exemplary polycarbonate polyol is (hexanediol-1,6-carbonate) glycol. It is recommended that their number average molecular weight be at least about 600, preferably at least about 1,000 and up to about 5,000, preferably up to about 3,000.

The monomolecular chain extender used as the hard segment is not critical and may be selected from conventional polyhydric alcohols and amines. Examples include 1,4-butylene glycol, 1,2-ethylene glycol, 1,3-propylene glycol, 1,6-hexylene glycol, 1,3-butylene glycol, dicyclohexylmethanediamine (hydrogenated MDA), and isophoronediamine (IPDA).

As the diisocyanate component, well-known ones may be used, although it is recommended in consideration of the yellowing resistance of the cover to use aliphatic and alicyclic diisocyanates. Illustrative are hexamethylene diisocyanate (HDI), 2,2,4- or 2,4,4-trimethylhexamethylene diisocyanate (TMDI), lysine diisocyanate (LDI), and dicyclohexylmethane-4,4'-diisocyanate (hydrogenated MDI). Of these, hexamethylene diisocyanate (HDI) and dicyclohexylmethane-4,4'-diisocyanate (hydrogenated MDI) are preferred since they are effective to impart yellowing resistance to the cover.

The thermoplastic polyurethane elastomer (b) can be prepared by blending suitable reactants selected from the above components and effecting synthesis in a well-known manner. Of the thermoplastic polyurethane elastomers thus synthesized, aliphatic or alicyclic polyurethane elastomers are recommended which are more heat resistant than aromatic polyurethane elastomers. More preferably, the aliphatic or alicyclic polyurethane elastomers are those synthesized using HDI or hydrogenated MDI.

The thermoplastic polyurethane elastomer (b) preferably has a high modulus of resilience according to JIS K7311. The elastomer should preferably have a modulus of resilience of at least 49%, more preferably at least 50%, even more preferably at least 60%, most preferably at least 70%. Too low a modulus of resilience may fail to impart rebound properties to the cover.

It is also recommended that the thermoplastic polyurethane elastomer (b) itself have a hardness as measured by a ASTM D2240 type A durometer of up to 98, preferably up to 95, more preferably up to 90, even more preferably up to 85. An elastomer with too high a durometer hardness may fail to impart sufficient flexibility to the cover stock. The lower limit of durometer hardness is preferably at least 70, more preferably at least 80.

As the thermoplastic polyurethane elastomer, commercially available products may be used. Preferred are commercially available thermoplastic polyurethane elastomers synthesized using aliphatic or alicyclic diisocyanates, especially HDI or hydrogenated MDI as the isocyanate component. Such products are available under the trade name of Pandex TR3080, Pandex T7890, Pandex T7298 (DIC Bayer Polymer Ltd.), Texin DP7-3005 and Texin DP7-3013 (Bayer AG).

The cover stock for the golf ball according to the invention is composed primarily of a mixture of the ionomer resin (a) and the thermoplastic polyurethane elastomer (b). It is recommended to mix 100 parts by weight of the ionomer resin (a) with at least 1 part, preferably at least 2 parts, more preferably at least 5 parts by weight and up to 30 parts, preferably up to 25 parts, more preferably up to 15 parts by weight of the thermoplastic polyurethane elastomer (b). Too small a proportion of the elastomer (b) may fail to achieve an improvement in the cover. Too large a proportion of the elastomer (b) may render the cover stock less resilient and exacerbate the compatibility between components (a) and (b) to induce phase separation, which adversely affects durability against shots. Additionally, the metal salt in the ionomer resin can serve as a catalyst to detract from heat resistance.

In addition to the essential components, ionomer resin (a) and thermoplastic polyurethane elastomer (b), the cover stock of the invention may contain optional components. For example, dispersion aids such as polyethylene wax, metal soaps, fatty acid esters and fatty acid amides may be added. Such dispersion aids are preferably added in such amounts as to improve the molding properties of the cover stock without compromising the performance of the ball. An appropriate amount of dispersion aids added is at least 0.2%, preferably at least 0.5%, more preferably at least 0.6% by weight and up to 10.0%, preferably up to 5.0%, more preferably up to 1.5% by weight, based on the entire cover stock.

Additionally, if desired, dyes, pigments (e.g., titanium dioxide, zinc oxide and barium sulfate), UV absorbers, antioxidants and the like may be added to the cover stock in commonly used amounts.

It is recommended to form the cover stock into a relatively thin cover. In this preferred embodiment, the cover stock is preferably prepared by adding suitable additives for reducing melt viscosity.

The cover stock is prepared, for example, by mixing the ionomer resin (a) and the thermoplastic polyurethane elastomer (b) in a suitable mixer which is selected from a roll mill, internal mixer, single and twin screw extruders depending on the mixing ratio of elastomer (b) to ionomer resin (a). In one preferred procedure, the thermoplastic polyurethane elastomer (b) is previously dissolved in a suitable solvent before it is mixed with the ionomer resin (a). The optional components mentioned above can be blended at any desired stage.

With respect to an index of heat resistance of the cover stock, it is recommended that the cover stock have a thermal decomposition temperature of at least 290° C., preferably at least 310° C. on thermogravimetric differential thermal analysis (TG-DTA) in a nitrogen atmosphere at a heating rate of 15° C./sec. With a lower decomposition temperature, the molded product may have poor physical properties (durability and resilience).

It is also recommended that the cover stock have a melt index of at least 1.7 dg/sec, especially at least 2.0 dg/sec, as measured according to JIS K7210 at a test temperature of 190° C. and under a test load of 21.18 N (2.16 kgf). A cover stock with too low a melt index may be difficult to mold. It is recommended that the upper limit of the melt index be up to 20 dg/sec, especially up to 10 dg/sec.

The cover formed from the cover stock should have a hardness of at least 55, preferably at least 57, more preferably at least 58, as measured by an ASTM D2240 type D durometer. A cover with too low a durometer hardness allows to receive excessive backspin on driver shots so that the ball may be readily affected by the wind and travel a shorter distance. The upper limit of the cover hardness is preferably up to 65, especially up to 62.

It is undesirable if the golf ball cover undergoes a discoloration upon UV exposure. With respect to an index of yellowing resistance, it is recommended that when the ball surface is exposed to a mercury lamp for 24 hours, the ball surface experiences a color difference ($\Delta YI$) before and after the lamp exposure of up to 8, more preferably up to 6, even more preferably up to 4, as measured by JIS K7103 reflection method.

The yellowness index of the ball surface is measured by a spectrophotometer according to JIS K7103 reflection method. The instrument according to JIS K7103 reflection method is, for example, multi-light-source spectrophotometer Model MSC-IS-2DH by Suga Tester Co., Ltd. The mercury lamp for irradiating ultraviolet radiation to the golf ball surface is, for example, a fading test mercury lamp H400-F by Toshiba Co., Ltd., combined with an accelerated G/B discoloration tester FM-1 by Suga Tester Co., Ltd.

The golf ball of the invention having a cover formed of the above-described cover stock is advantageous in travel distance performance because the ball does not receive excessive backspin upon driver shots, despite a relatively low hardness. The ball is also improved in durability against shots. The cover stock used avoids any discoloration upon long-term exposure to UV and is easy to mold.

The core to be enclosed with the cover is not critical and may be either a wound core or a solid core. The use of solid core is recommended since injection molding of the cover stock is advantageous for molding efficiency and mass-scale production. The solid core may be a single-layer core or a core of two or more layers. The solid core may be formed using a well-known rubber composition based on cis-1,4-polybutadiene.

Whether the core is either a wound core or a solid core, its diameter, weight, hardness and other parameters are not critical. Among many possible settings, the core diameter is preferably at least 34.67 mm, especially at least 36.67 mm and up to 40.90 mm, especially up to 40.50 mm; the core weight is preferably at least 21.4 g, especially at least 26.0 g and up to 40.5 g, especially up to 39.45 g; and the core hardness is preferably at least 2.0 mm, especially at least 2.4 mm and up to 4.2 mm, especially up to 3.8 mm, as expressed by a deflection under an applied load of 100 kg.

The golf balls of the invention include two-piece solid golf balls having a solid core of single-layer structure, three-piece solid golf balls having a solid core of two-layer structure, multi-piece solid golf balls having a solid core of multilayer structure, and wound golf balls having a thread wound core.

It is not critical how to enclose the core with the cover stock. Conventional methods used with prior-art ionomer resin cover stocks are employable. For example, the cover stock is injection molded directly around the core. Another method involves previously molding the cover stock into a pair of hemispherical half cups, encasing the core within the half cups, and effecting compression molding at about 140 to 180° C. for about 2 to 10 minutes.

No particular limits are imposed on the thickness, specific gravity and other parameters of the cover. Among many possible settings, the cover thickness is preferably at least 0.2 mm, especially at least 0.5 mm and up to 4.0 mm, more preferably up to 3.0 mm, even more preferably up to 2.0 mm, especially up to 1.0 mm. The cover of the inventive cover stock can be formed to a thin gage.

After the completion of molding, the golf ball on its surface is subjected to finishing steps such as buffing, stamping and painting. The golf ball of the invention which is constructed as above preferably has a hardness corresponding to a deflection of at least 2.2 mm, especially at least 2.5 mm and up to 4.0 mm, especially up to 3.5 mm, under an applied load of 100 kg.

The golf balls of the invention for competition play are prepared in accordance with the Rules of Golf to a diameter of not less than 42.67 mm and a weight of not greater than 45.93 g.

The golf ball exhibits improved rebound and receives not so excessive backspin upon driver shots despite a relatively low hardness, and thus offers excellent travel distance performance as well as durability against shots. The golf ball avoids any discoloration upon long-term UV exposure and is improved in molding efficiency.

EXAMPLE

Examples of the invention are given below by way of illustration and not by way of limitation.

Examples 1–7 and Comparative Examples 1–5

Preparation of Core

Core compositions as formulated in Table 1 were milled, then molded and vulcanized in a mold at 155° C. for 20 minutes, obtaining three solid cores A to C. The diameter, specific gravity, hardness and weight of the solid cores were measured, with the results also shown in Table 1.

TABLE 1

|  |  | A | B | C |
|---|---|---|---|---|
| Core composition (pbw) | Polybutadiene rubber | 100.0 | 100.0 | 100.0 |
|  | Zinc diacrylate | 21.5 | 21.5 | 21.5 |
|  | Zinc oxide | 13.0 | 19.7 | 26.3 |
|  | Dicumyl peroxide | 1.0 | 1.0 | 1.0 |
|  | Peptizer | 1.0 | 1.0 | 1.0 |

TABLE 1-continued

|  |  | A | B | C |
|---|---|---|---|---|
| Core physical properties | Specific gravity | 1.08 | 1.12 | 1.16 |
|  | Diameter (mm) | 38.5 | 38.5 | 38.5 |
|  | Weight (g) | 32.3 | 33.5 | 34.7 |
|  | Hardness (mm) | 3.4 | 34 | 3.4 |

Cover stocks were injection molded around the solid cores A, B and C to form covers in the combination as shown in Tables 2 and 3. In this way, two-piece solid golf balls of Examples 1–7 and Comparative Examples 1–5 were obtained.

The golf balls were examined by the following tests, with the results being also shown in Tables 2 and 3.

Golf Ball Hardness

Ball hardness was expressed by a deflection (mm) of a ball under an applied load of 100 kg. A larger value indicates that the ball is softer. It is noted that the core hardness in Table 1 is a deflection (mm) of a core under an applied load of 100 kg.

Initial Velocity

An initial velocity was measured as prescribed by USGA.

Machine Test

Using a swing robot machine equipped with No. 1 wood or driver, the ball was actually hit at a head speed of 45 m/sec. Carry, total distance and spin were measured. Based on the measured results, overall rating was made according to the following criterion.

O: both carry and total are greater by at least 3 m than Comparative Example 1

Δ: difference in carry and total from Comparative Example 1 is less than 3 mm

X: either carry or total is inferior to Comparative Example 1

Feel on Driver Shot

A panel of five professional golfers and five top amateur golfers actually hit the ball with No. 1 wood or driver and evaluated according to the following criterion.

O: very good

Δ: ordinary

X: poor (too hard or too soft)

Durability Against Repetitive Hits

Using a swing robot machine equipped with No. 1 wood or driver, the same ball was repetitively hit at a head speed of 38 m/sec. The number of hits was counted until the ball cracked. Based on the count, rating was made according to the following criterion.

⊚: no crack over 300 hits

O: cracked between 200 and 299 hits

Δ: cracked between 150 and 199 hits

X: cracked within 149 hits

Discoloration (ΔYI)

The ball on the surface was exposed for 24 hours to a mercury lamp (accelerated G/B discoloration tester FM-1 by Suga Tester Co., Ltd./fading test mercury lamp H400-F by Toshiba Co., Ltd.). The yellowness index was measured by a multi-light-source spectrophotometer Model MSC-IS-2DH by Suga Tester Co., Ltd. according to JIS K7103 reflection method. A color difference (ΔYI) before and after the UV exposure was calculated. A larger value indicates more yellowing or discoloration.

Molding

Molding was evaluated in terms of both melt flow rate (MFR) and decomposition temperature (Tp).

O: MFR≧1.7 dg/sec, Tp≧290° C.

X: MFR<1.7 dg/sec, Tp<290° C.

MFR

A melt flow rate (dg/sec) was measured according to JIS K7210 at a temperature of 190° C. and a load of 21.18 N (2.16 kgf).

Decomposition Temperature

Using Thermoplus TG8120 by Rigaku Co., Ltd., a decomposition initiation temperature was measured by thermogravimetric differential thermal analysis (TG-DTA) in a nitrogen atmosphere at a heating rate of 15° C./sec.

Durometer Hardness

With respect to the hardness measured by ASTM D2240 type D durometer (referred to as durometer D hardness) and the hardness measured by ASTM D2240 type A durometer (referred to as durometer A hardness), the surface hardness of a resin sheet rather than the surface hardness of a ball was measured according to JIS K6253.

The components used are described below.

Peptizer: zinc salt of pentachlorothiophenol Surlyn AD8542: E. I. Dupont, ethylene-methacrylic acid-methacrylate terpolymer ionomer resin, acid content ~10 wt %, ion species Mg, ester content ~20 wt %, durometer D hardness 42

Himilan AM7318: Dupont-Mitsui Polychemical Co., Ltd., ethylene-methacrylic acid copolymer ionomer resin, acid content ~18 wt %, ion species Na, durometer D hardness 67

Himilan AM7317: Dupont-Mitsui Polychemical Co., Ltd., ethylene-methacrylic acid copolymer ionomer resin, acid content ~18 wt %, ion species Zn, durometer D hardness 66

Himilan 1605: Dupont-Mitsui Polychemical Co., Ltd., ethylene-methacrylic acid copolymer ionomer resin, acid content ~15 wt %, ion species Na, durometer D hardness 63

Himilan 1706: Dupont-Mitsui Polychemical Co., Ltd., ethylene-methacrylic acid copolymer ionomer resin, acid content ~15 wt %, ion species Zn, durometer D hardness 62

Pandex TR3080: DIC Bayer Polymer Ltd., non-yellowing thermoplastic polyurethane elastomer of aliphatic diisocyanate/polyester polyol, durometer A hardness 91, modulus of resilience 60%

Pandex T7298: DIC Bayer Polymer Ltd., non-yellowing thermoplastic polyurethane elastomer of aliphatic diisocyanate/polyester polyol, durometer A hardness 98, modulus of resilience 57%

Texin DP7-3013; Bayer AG, non-yellowing thermoplastic polyurethane elastomer of alicyclic diisocyanate/polyester polyol, durometer A hardness 84, modulus of resilience 50% T-1190: DIC Bayer Polymer Ltd., standard type thermoplastic polyurethane elastomer of MDI/polyester polyol, durometer A hardness 92, modulus of resilience 48%

TABLE 2

| | | Example | | | | | | |
|---|---|---|---|---|---|---|---|---|
| | | 1 | 2 | 3 | 4 | 5 | 6 | 7 |
| Composition (pbw) | | | | | | | | |
| Ionomer resin | AD8542 | | | | | | | |
| | AM7318 | | | | | 50 | | |
| | AM7317 | | | | | 50 | | |
| | H1605 | 50 | 50 | 50 | 50 | | 50 | 50 |
| | H1706 | 50 | 50 | 50 | 50 | | 50 | 50 |
| Thermoplastic polyurethane elastomer | TR3080 | 25 | 10 | 5 | 2 | 25 | | |
| | T7298 | | | | | | 10 | |
| | DP7-3013 | | | | | | | 10 |
| | T-1190 | | | | | | | |
| Core type | | B | C | C | C | B | C | C |
| Cover stock physical properties | | | | | | | | |
| ASTM D2240 Type Durometer D hardness | | 55 | 60 | 61 | 61 | 61 | 61 | 56 |
| MFR | | 3.1 | 2.1 | 1.9 | 1.8 | 3.2 | 3.2 | 3.1 |
| Decomposition temperature (° C.) | | 328 | 328 | 330 | 330 | 328 | 329 | 310 |
| Molding | | ○ | ○ | ○ | ○ | ○ | ○ | ○ |
| Ball physical properties | | | | | | | | |
| Outer diameter (mm) | | 42.70 | 42.71 | 42.70 | 42.69 | 42.69 | 42.71 | 42.70 |
| Weight (g) | | 45.12 | 45.20 | 45.15 | 45.12 | 45.12 | 45.21 | 45.19 |
| Hardness (mm) | | 3.1 | 2.9 | 2.7 | 2.6 | 2.9 | 2.9 | 3.0 |
| Initial velocity (m/s) | | 77.05 | 77.08 | 77.10 | 77.15 | 77.15 | 77.08 | 77.12 |
| Feel on driver shot | | ○ | ○ | ○ | ○ | ○ | ○ | ○ |
| Durability against repetitive hits | | >300 | >300 | >300 | >300 | >300 | >300 | >300 |
| Durability rating | | ◎ | ◎ | ◎ | ◎ | ◎ | ◎ | ◎ |
| Color difference (ΔYI) | | 3.0 | 2.8 | 2.5 | 2.0 | 3.0 | 3.0 | 2.9 |
| Discoloration rating | | ○ | ○ | ○ | ○ | ○ | ○ | ○ |
| Machine test | | | | | | | | |
| Spin (rpm) | | 2410 | 2320 | 2270 | 2280 | 2260 | 2280 | 2320 |
| Carry (m) | | 211.4 | 211.0 | 210.7 | 210.6 | 211.0 | 210.5 | 211.2 |
| Total (m) | | 225.8 | 225.7 | 226.2 | 226.5 | 225.9 | 226.1 | 225.7 |
| Rating | | ○ | ○ | ○ | ○ | ○ | ○ | ○ |

TABLE 3

| | | Comparative Example | | | | |
|---|---|---|---|---|---|---|
| | | 1 | 2 | 3 | 4 | 5 |
| Composition (pbw) | | | | | | |
| Ionomer resin | AD8542 | | | 30 | | |
| | AM7318 | | 50 | | | |
| | AM7317 | | 50 | | | |
| | H1605 | 50 | | 35 | | |
| | H1706 | 50 | | 35 | 100 | 100 |
| Thermoplastic polyurethane elastomer | TR3080 | | | | 230 | |
| | T7298 | | | | | |
| | DP7-3013 | | | | | |
| | T-1190 | | | | | 230 |
| Core type | | C | C | C | A | A |
| Cover stock physical properties | | | | | | |
| ASTM D2240 Type Durometer D hardness | | 63 | 67 | 55 | 47 | 47 |
| MFR | | 1.5 | 2.0 | 1.3 | 9 | 8 |
| Decomposition temperature (° C.) | | 450 | 448 | 438 | 285 | 260 |
| Molding | | X | ○ | X | X | X |
| Ball physical properties | | | | | | |
| Outer diameter (mm) | | 42.69 | 42.69 | 42.70 | 42.70 | 42.70 |
| Weight (g) | | 45.06 | 45.07 | 45.06 | 45.10 | 45.10 |
| Hardness (mm) | | 2.3 | 2.0 | 3.0 | 3.7 | 3.6 |
| Initial velocity (m/s) | | 77.15 | 77.28 | 76.75 | 76.91 | 76.51 |
| Feel on driver shot | | Δ | X | ○ | Δ | Δ |
| Durability against repetitive hits | | 190 | 140 | >300 | 180 | 170 |
| Durability rating | | Δ | X | ◎ | Δ | Δ |
| Color difference (ΔYI) | | 1.2 | 1.1 | 1.3 | 3.0 | 8.2 |
| Discoloration rating | | ○ | ○ | ○ | ○ | X |
| Machine test | | | | | | |
| Spin (rpm) | | 2060 | 1980 | 2580 | 2907 | 2910 |
| Carry (m) | | 206.2 | 211.0 | 210.3 | 210.3 | 210.0 |
| Total (m) | | 222.3 | 226.1 | 223.7 | 222.3 | 219.5 |
| Rating | | Δ | ○ | Δ | Δ | X |

As seen from Tables 2 and 3, the golf balls within the scope of the invention are satisfactory in all the tested properties including good rebound, good flight performance, pleasant feel on hits, durability against repetitive hits, minimized yellowing and ease of molding.

By contrast, the cover stocks of Comparative Examples 1 to 5 are outside the scope of the invention and have some drawbacks. The golf balls of Comparative Examples 1 and 2 using a high hardness ionomer resin as the cover stock offer a hard feel when hit and are less durable against repetitive hits. The golf ball of Comparative Example 3 using a blend of high and low hardness ionomer resins is inefficient to mold and inferior in rebound and flight performance. The golf ball of Comparative Example 4 using a cover stock having an excess proportion of aliphatic diisocyanate base thermoplastic polyurethane elastomer blended with an ionomer resin is inferior in rebound and travel distance and is less durable due to poor compatibility. The golf ball of Comparative Example 5 using an aromatic diisocyanate base polyurethane elastomer is inferior in yellowing resistance, rebound, heat resistance and molding.

The golf ball of the invention is quite advantageous in travel distance performance because excessive backspin is not imparted upon driver shots although the hardness is relatively soft. The golf ball has high durability against shots as well. The golf ball uses a cover stock which avoids any discoloration upon long-term UV exposure and is amenable to improvements in molding.

Japanese Patent Application No. 2000-340222 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. A golf ball comprising a core and a cover wherein said cover is formed of a cover stock based on a mixture of (a) an ionomer resin and (b) a thermoplastic polyurethane elastomer and having a hardness of at least 55 as measured by an ASTM D2240 type D durometer, wherein the thermoplastic polyurethane elastomer (b) has a modulus of resilience of at least 49%.

2. The golf ball of claim 1, wherein the thermoplastic polyurethane elastomer (b) is one synthesized using an aliphatic or alicyclic diisocyanate as the isocyanate component.

3. The golf ball of claim 1, wherein the aliphatic or alicyclic diisocyanate is HDI or hydrogenated MDI.

4. The golf ball of claim 1, wherein when the ball surface is exposed to a mercury lamp for 24 hours, the ball surface experiences a color difference ($\Delta YI$) before and after the lamp exposure of up to 8 as measured by JIS K7103 reflection method.

5. A golf ball comprising a core and a cover wherein said cover is formed of a cover stock based on a mixture of (a) an ionomer resin and (b) a thermoplastic polyurethane elastomer and having a hardness of at least 55 as measured by an ASTM D2240 type D durometer, wherein the ionomer resin (a) and the thermoplastic polyurethane elastomer (b) are mixed in a weight ratio of from 100:30 to 100:1.

6. The golf ball of claim 5, wherein the thermoplastic polyurethane elastomer (b) is one synthesized using an aliphatic or alicyclic diisocyanate as the isocyanate component.

7. The golf ball of claim 5, wherein the aliphatic or alicyclic diisocyanate is HDI or hydrogenated MDI.

8. The golf ball of claim 5, wherein when the ball surface is exposed to a mercury lamp for 24 hours, the ball surface experiences a color difference ($\Delta YI$) before and after the lamp exposure of up to 8 as measured by JIS K7103 reflection method.

9. A golf ball comprising a core and a cover wherein said cover is formed of a cover stock based on a mixture of (a) an ionomer resin and (b) a thermoplastic polyurethane elastomer and having a hardness of at least 55 as measured by an ASTM D2240 type D durometer, wherein the cover stock has a polymer decomposition temperature on TG-DTA measurement of at least 290° C.

10. The golf ball of claim 9, wherein the thermoplastic polyurethane elastomer (b) is one synthesized using an aliphatic or alicyclic diisocyanate as the isocyanate component.

11. The golf ball of claim 9, wherein the aliphatic or alicyclic diisocyanate is HDI or hydrogenated MDI.

12. The golf ball of claim 9, wherein when the ball surface is exposed to a mercury lamp for 24 hours, the ball surface experiences a color difference ($\Delta YI$) before and after the lamp exposure of up to 8 as measured by JIS K7103 reflection method.

* * * * *